No. 620,795. Patented Mar. 7, 1899.
J. J. McCLIMONT.
WATER CYCLE.
(Application filed Apr. 13, 1898.)
(No Model.)
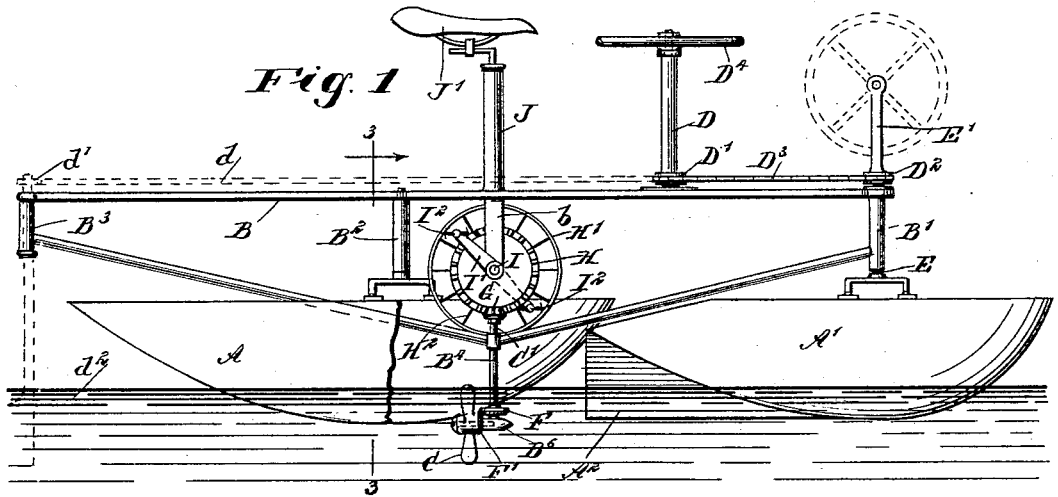
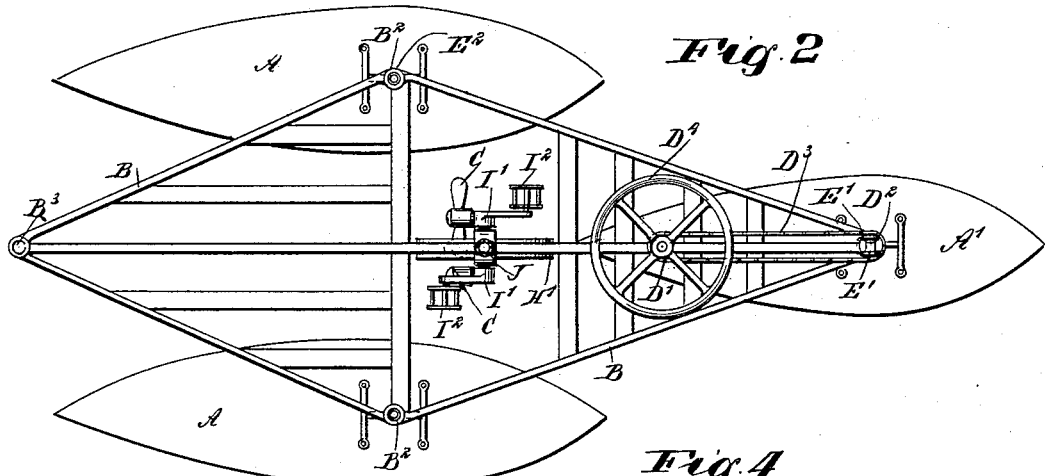
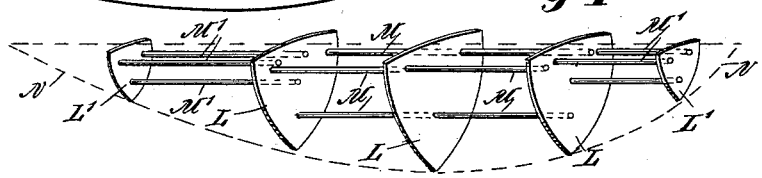
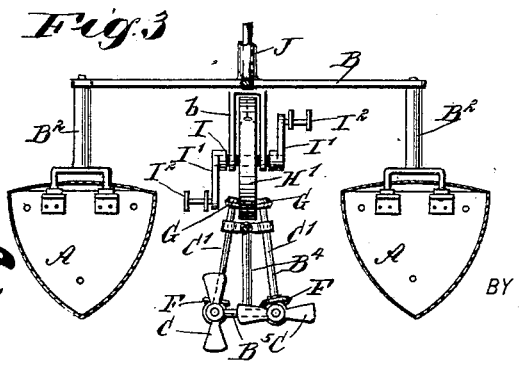
WITNESSES:
INVENTOR
J. J. McClimont
BY
ATTORNEYS.

UNITED STATES PATENT OFFICE.

JOHN J. McCLIMONT, OF UNION, HUDSON COUNTY, NEW JERSEY.

WATER-CYCLE.

SPECIFICATION forming part of Letters Patent No. 620,795, dated March 7, 1899.

Application filed April 13, 1898. Serial No. 677,393. (No model.)

*To all whom it may concern:*

Be it known that I, JOHN J. McCLIMONT, of the town of Union, in the county of Hudson and State of New Jersey, have invented a new and Improved Water-Cycle, of which the following is a full, clear, and exact description.

My invention relates to an improvement in that class of devices known as "water-cycles" and which are provided with floats and with propelling means comprising a pedal-and-crank mechanism.

My invention consists of the novel features of construction, which will be hereinafter described and claimed.

Reference is to be had to the accompanying drawings, forming a part of this specification, in which similar characters of reference indicate corresponding parts in all the views.

Figure 1 is a side elevation of the device with one of the rear floats partially broken away, so as to show the propelling mechanism. Fig. 2 is a top plan view of the device, the seat-mast tube being shown in horizontal section. Fig. 3 is a cross-section on the line 3 3 of Fig. 1, and Fig. 4 is a perspective view showing the construction of the floats.

The device is provided with a plurality of floats, the number of which may be three or more, as desired. In the drawings I have shown only three floats. Of these the floats A will be arranged alongside of each other, and the float A', which is of somewhat similar construction, is arranged in front of the floats A and on the center line of the device. All of the floats are provided with vertical pivots located forward of their center and extending upward through the tubes B' and B² of the frame. The floats are thus pivotally connected with the frame B, upon which frame the seat for the rider and the mechanism for propelling and controlling the device is mounted. The floats being free to swing upon their pivots and these pivots being forward of the center, the floats will be automatically held with their short ends forward under all circumstances.

The pivot E of the forward float A' is provided at its upper end with a sprocket-wheel D². Upon the frame B, at a point where it may be conveniently reached by the rider, is a vertical pivot D, having upon its lower end a sprocket-wheel D' and at its upper end a steering-wheel D⁴ or other device by which it may be rotated. The sprocket-wheels D' and D² are connected by a chain D³, by which means the angle of the forward float A' may be changed as desired and the same used as a rudder. The forward float is also preferably provided with a keel or fin A², which extends down to about the same depth as the float. This acts further as a rudder to control the direction of the float.

Depending from the frame B is a standard B⁴, carrying at its lower end, which lies in the water, a cross-bar B⁵, in the ends of which are journaled the shafts of the horizontal propelling-wheels C. These shafts are provided on their periphery with bevel-gears F', adapted to mesh with the bevel-gears F upon vertical shafts C', which are mounted to turn in the frame. These shafts at their upper ends are provided with bevel-gears G, meshing with the double-facing bevel-gear H. As herein shown, the propelling mechanism is in duplicate—that is, there are two propeller-wheels and the bevel connections. A single wheel might be used when desired. The large bevel-gear H is mounted upon a horizontal shaft I, journaled in a hanger $b$, depending from the frame B, said shaft constituting a pedal crank-shaft and being provided with cranks I' and pedals I², by means of which the rider may cause it to rotate. Spokes H² project from the periphery of the gear-wheel H, and the spokes are connected by a band H' of any suitable metal, thus forming a fly-wheel for the shaft I. Upon the frame B is a tube J, receiving the mast of a saddle J', which is occupied by the rider. The frame is extended to the rear of the seat and may be provided with a vertical tube B³, which may be used to receive the pivot of a fourth float or of a rudder $d²$, as shown in dotted lines in Fig. 1. This float or rudder may be made to turn in unison with the forward float by means of a sprocket-wheel $d'$ on a shaft passing through the tube B³ and a chain $d$, which connects said sprocket-wheel with the sprocket-wheel D' on the steering-standard D. While the floats may be made of any desired construction, a preferable construction is that shown in Fig. 4. This consists of cross-partitions or bulkheads L and L', connected with each other by longitudinal bars or tubes M and M'. Over these connected partitions or bulkheads is stretched an envelop of impervious material, such as canvas or rubber. The end of each float may be provided with a conical point N, constructed of light sheet metal.

For convenience in moving the device while on land the frame B is provided at its forward end with a standard adapted to receive the steering-wheel $D^4$, which latter is made easily removable and upon which the device when inverted may be trundled as a wheelbarrow. As herein shown, this standard is made as a yoke E' and is a continuation of the pivot E. It may, however, be made independent therefrom and fixed to the frame at any convenient point.

This device is light and may be carried wherever desired and will suffice to support one or more riders, by whom it may be propelled rapidly over the water.

Having thus described my invention, I claim as new and desire to secure by Letters Patent—

1. A boat, comprising a series of floats, one being located ahead of the others, a connecting-frame for said floats, pivots upon each float located forward of its center and journaled in the frame, and means for manually controlling the position of the forward float, substantially as described.

2. A boat, comprising a series of floats one being located ahead of the others, a connected frame for said floats, pivots upon each float located forward of its center and journaled in the frame, a sprocket-wheel on the pivot of the forward or steering float, a vertical shaft having a steering-wheel and a sprocket-wheel thereon, and a chain connecting the two sprocket-wheels, substantially as described.

3. A boat, comprising a series of floats one being arranged ahead of the others, a connecting-frame for said floats, pivots upon each float located forward of its center and journaled in the frame, a steering mechanism connected to the pivot of the forward float, a propelling-wheel mounted on the frame, a foot-crank and mechanism connecting the crank with the wheel to revolve it, substantially as described.

4. A boat, comprising a series of floats, one being arranged ahead of the others, a frame connecting said floats, the forward float having an upwardly-extending pivot journaled in the frame and projecting above the same, the upper end of the pivot being formed as a yoke adapted to have a wheel journaled in its end, a steering-shaft having a hand-wheel thereon, and connections from the steering-shaft to the pivot of the forward float, the hand-wheel being interchangeably attachable to the steering-shaft and the yoke on the pivot of the forward float whereby when the wheel is placed in the yoke the frame may be trundled upon the same when inverted, substantially as described.

JOHN J. McCLIMONT.

Witnesses:
 EVERARD BOLTON MARSHALL,
 H. L. REYNOLDS.